United States Patent [19]

Kondakov

[11] Patent Number: 5,554,328
[45] Date of Patent: Sep. 10, 1996

[54] METHOD OF MAKING HEAT AND IMPACT RESISTANT COMPOSITE CERAMIC MATERIAL

[75] Inventor: Stanislav F. Kondakov, Chernagolovka, Russian Federation

[73] Assignee: Composite Materials, Inc., Fairfax, Va.

[21] Appl. No.: 360,903

[22] Filed: Dec. 21, 1994

[51] Int. Cl.⁶ ............................................. B29C 59/00
[52] U.S. Cl. ..................................... 264/60; 264/122
[58] Field of Search .............................. 264/60, 122

[56] References Cited

U.S. PATENT DOCUMENTS 4,837,231  6/1989  Endo et al. ............................ 501/91
5,169,572  12/1992  Matthews .............................. 264/27
5,418,196  5/1995  Niihara ................................ 501/87

*Primary Examiner*—Christopher A. Fiorilla
*Attorney, Agent, or Firm*—Morgan & Finnegan

[57] ABSTRACT

The invention provides a ceramic composite material which includes 50–90% boron carbide, 5–30% silicon carbide, and 3–22% titanium carbide. All constituents are in powder form, and have a particle size of between 1 and 40 microns, and a purity of at least 97%. The powdered constituents are blended and consolidated by either hot isostatic pressing (HIPing) or by hot pressing, although blanks of less quality can be formed by mere sintering.

18 Claims, No Drawings

METHOD OF MAKING HEAT AND IMPACT RESISTANT COMPOSITE CERAMIC MATERIAL

FIELD OF THE INVENTION

The present invention relates generally to ceramic composite materials and, more specifically, to a heat-resistant and impact-resistant ceramic composite having applications in numerous industries, including but not limited to heat engine parts, turbine blades, cutting tools, wear parts, and generally, any products that are exposed to high temperatures and mechanical loads and/or aggressive chemical environments. The composite includes 50–90% boron carbide, 5–30% silicon carbide, and 3–22% titanium carbide.

BACKGROUND OF THE INVENTION

Ceramic composite materials have been proposed for a variety of applications. In certain types of nozzles, turbine blades and rotors, heat conducting tubes, crucibles, etc., the working temperatures can be as high as 1,700 to 1,800° C. while experiencing mechanical loads up to 400 MPa. For short periods of time temperatures can exceed 2,500° C. Thus, materials used to make these products should be both heat and impact resistant, as well as fracture tough.

For anti-ballistic applications, a suitable material for making personal bullet-proof vests, armor protection against anti-tank weapons, bullet-proof automobiles, and numerous other armor applications, should be impact resistant, light weight, and wherever possible, made of cost-effective, relatively light materials.

There is a significant demand for materials that are light but hard, that have high fracture toughness at high temperatures, and are highly thermal-shock resistant, and can withstand highly aggressive/corrosive environments. Products made from materials with such properties will be able to achieve major breakthroughs in a myriad of applications, including high temperature, high-load applications, both in air and in chemically aggressive environments. Furthermore, there is a need for light-weight materials with high fracture toughness for a wide range of anti-ballistic (armor) applications.

Boron carbide is a suitable material for some of these applications. However, the application domains in which boron carbide can be used are limited by its negative qualities, such as brittleness (2–3 MPa×m$^{0.5}$), low resistance to heat, loss of strength at high temperature, and low thermal-shock resistance.

U.S. Pat. No. 4,678,759 describes a ceramic composite material containing boron carbide, silicon carbide, zirconium boride, and aluminum nitride. However, this material has relatively low high-temperature strength, low thermal-shock resistance, and is further restrained by a relatively complicated production process.

U.S. Pat. No. 4,320,204 describes another ceramic composite material containing boron carbide, silicon carbide, and aluminum. As in the previous prior art patent, this material has drawbacks, including relatively low high-temperature strength, low thermal-shock resistance and low fracture toughness.

Thus, a continuing need exists for an improved ceramic composite material capable of achieving improved physical properties and performance characteristics.

SUMMARY OF THE INVENTION

An object of the present invention is to provide a ceramic composite material having myriad uses and diverse applications.

Another object of the present invention is to provide a ceramic composite material exhibiting an increase in high temperature strength and impact resistance.

Another object of the present invention is to provide a ceramic composite material exhibiting high heat resistance and high thermal-shock resistance.

Still another object of the present invention is to provide a ceramic composite material which is composed of relatively inexpensive non-metallic constituents, and is capable of being manufactured relatively inexpensively.

Another object of the present invention is to provide a ceramic composite material in which its physical properties can be tailored for different end uses by adjusting one or more of the following aspects of its composition and/or production method: (a) variations in material granularity and quality; (b) variations in selection of production method; (c) variations in composite ratios; (d) relatively minor additions of new constituents; (e) variations in specific process steps in each production process; and (f) introduction of certain fibers or whiskers to reinforce the invented material.

These and other objects of the invention are met by providing a ceramic composite material which includes 50–90% boron carbide, 5–30% silicon carbide, and 3–22% titanium carbide. All constituents are in powder form, and have a particle size of between 1 and 40 microns, and a purity of at least 97%. The powdered constituents are blended and consolidated by either hot isostatic pressing (HIPing) or by hot pressing, although blanks of less quality can be formed by mere sintering.

Properties are optimized with the constituent materials provided in the mass ratios of 70–80% boron carbide, 14–20% silicon carbide, and 5–11% titanium carbide.

Another aspect of the present invention includes a method of forming a ceramic composite material in which the aforementioned constituents are hot pressed under the following parameters: press temperature of 2,200°–2,250° C., pressure of 2.7 to 3.3 kg/mm$^2$, and time in mold after substantial completion of desired densification of 10–30 minutes.

Other objects, advantages and salient features of the invention will become apparent from the following detailed description, which discloses preferred but non-limiting embodiments of the invention.

DETAILED DESCRIPTION OF THE PREFERRED EMBODIMENTS

The present invention includes a ceramic composite material which contains boron carbide, silicon carbide, and titanium carbide, all of which are, prior to consolidation, in powder form and of powder particle size between 1 and 40 microns, with the range of 3 to 10 microns being preferred, and purity of 97 percent and higher. The cost-quality optimal is at or about 98 percent.

The preferred mass ratios are as follows:

| | Optimal properties range | General Range |
|---|---|---|
| Boron carbide: | 70–80% | 50–90% |
| Silicon carbide: | 14–20% | 5–30% |
| Titanium carbide: | 5–11% | 3–22% |

The general range is used as a trade-off where certain properties and qualities can be traded for cost and simplification of production, whereas the optimal properties range provides the best overall physical properties.

The ceramic composite material of the present invention is produced by sintering, hot press or by HIP. Sintering is the least expensive and simplest but results in significant degradation of several properties such as impact-resistance and strength. Hot-press and HIPing are preferred for achieving the best all-around properties.

To achieve the desired overall quality for the present ceramic composite material, the following hot-press production parameters were used:

Temperature of hot press: 2,200°–2,250° C.

Pressure: 2.7–3.3 kg/mm$^2$

Time to continue molding after achieving desired densification 10–30 minutes.

Methodology

The ceramic material of the present invention is produced pursuant to the following steps. First, the powders of the above mentioned components with the particle size of, preferably, 3–10 micrometers are mixed in the desired proportions in a vibration ball mill to obtain homogeneous distribution of components in the resultant composite mixture and a uniform distribution of particle sizes. Mixing time depends on the specific ratios, particle sizes, and mixing techniques. In one example, using the ball mill, mixing took 4–5 hours. The blended composite mixture thus obtained is pressed into raw product form that is finally processed by hot press or high temperature isostatic pressure (HIP). To obtain products of adequate quality it is necessary to strictly follow the production procedure, since this material is very sensitive to variations of temperature and pressure, and pressure and duration of the exposure to heat and pressure after achieving desired densification. For example, if the temperature during hot press changes more then 30–50 degrees, the material will either degrade or not have its expected strength.

EXAMPLE I 100 gm of boron carbide powder (76.9% mass) with the average particle diameter 3–10 mkm, 20 gm of silicon carbide powder (15.4% mass) with the average particle diameter of 3–7 mkm, and 10 gm (7.7% mass) of titanium carbide with the average particle diameter of 3–10 mkm are blended as stated above. The resultant blend is then pressed into raw product forms which are then hot pressed at high temperature.

Hot pressing is done as follows. The composite powder mixture or the raw product form is put into the graphite press-mold. The press-mold is installed in a press and filled with zirconium dioxide or boron nitride, the preliminary pressure of 0.2–0.5 kg/mm$^2$ is applied and heating is turned on. Heating is done in the air or in an inert gas with the rate of 35°–50° C. per minute.

When the working temperature of the press-mold is reached (2,200°–2,250° C., depending on the quality of the raw materials), the press-mold is exposed to the steadily rising pressure up to 2.7–3.3 kg/mm$^2$. When the desired densification of the molded composite ceramic material is achieved, the press-mold is retained under pressure for another 10–30 minutes, after which the heating is cut off. The pressure is maintained until the temperature drops to 500°–800° C. Further cooling down to room temperature is performed without pressure. When cool, the press-mold is opened and the ready composite ceramic material is taken out.

Test Results

Samples made according to Example I were tested for high temperature strength (bending at 1,700° C.), heat resistance, and impact resistance (ballistic tests/fire tests).

Samples 4×4×27 mm were mounted in a device for 4-point bending tests in a vacuum chamber and stress was applied at 1,700° C. until the sample snapped. The load at breaking point was measured and the maximum resistance to bending was calculated.

The heat resistance of similar samples was measured. The change in the mass of the sample was measured after oxidation in air at 1,200° C. during 10 hours.

Thermal-shock resistance of the samples was measured using cylindrical samples 10 mm in diameter and 10 mm high. The number of thermal-shocks (from 1,200° C. to water at 10° C.) necessary to destroy the sample was determined.

The impact resistance of the samples was tested using samples 130 mm in diameter and 6–10 mm thick. Ballistic tests were conducted by firing a thermo-hardened bullet from an AK-47 (bullet velocity 890 m/s) and standard bullet from M16 (985 m/s) from a distance of 5 meters.

All tests were conducted using several samples for each test. The following properties of the present material were observed:

| | |
|---|---|
| Density (g/cm$^3$) | 2.7–2.82 |
| Porosity (%) | 2–3 |
| Elastic Modulus (GPa) | 430–440 |
| Hardness (GPa) | 30–40 |
| Melting (Decomposition) (°C.) | 2,300–2,500 |
| Thermal Expansion Coefficient (10$^6$ (°C.)$^{-1}$) | 5–6 |
| Bending Strength (MPa) | 380–410 |
| Bending Strength at 1,700° C. (MPa) | ≧400 |
| Fracture Toughness (MPa × m$^{1/2}$) | 10–15 |
| Ballistic Testing (Damaged Area Around Impact Point) (mm) | 35–45 |
| Thermal-Shock | 30–35 cycles |
| Heat Resistance (mg/cm$^2$) | 0.5–1 |

The heat resistance measure is the change in mass due to oxidation in air at 1,200° C. after 10 hour exposure.

One aspect of the present invention is that the material properties can be traded off for other advantages. For example, the optimum amount of boron carbide is in the range of 70 to 80 percent. If the percentage ratio of boron carbide is less than 70 percent, the heat-resistance and impact-resistance capabilities become considerably degraded. On the other hand, increasing the amount of boron carbide more than 80 percent results in degradation of temperature-shock resistance and heat-resistance.

The optimum amount of silicon carbide is in the range of 14 to 20 percent. Reducing silicon carbide to less than 14 percent degrades the thermal-shock resistance property of the material. Increasing silicon carbide to more than 20 percent will degrade the heat strength of the material.

The introduction of 5 to 11 percent of titanium carbide in the composite mixture improves the heat strength, thermal-shock resistance, and fracture toughness (impact resistance) of the material.

While ranges outside the optimal ranges provide acceptable trade-offs, ranges outside the general ranges are considered to have unacceptable results.

Yttrium oxide can be added to the three constituent materials in order to simplify the production process, but its addition compromises certain other properties such as heat-strength resistance and impact resistance.

Sintering, as opposed to HIPing or hot pressing, can be used where certain uses are envisioned where high strength and impact resistance are not as critical.

In addition to the many other uses envisioned for the present material, anti-ballistic applications appear to be particularly promising. In this regard, the material behaves in an unusual manner, in that upon impact by a bullet or other projectile, an armor plate made of the present material does not resist impact to a point and then shatter catastrophically. Instead, the present ceramic material deforms without shattering catastrophically, by resisting the impacting projectile to a certain point and then punctures, with a concomitant formation of a damaged area around the impact point. This permits repeated hits before having a plate failure.

Armor plating made of the present material can have any suitable size or shape, such as basic rectangles with a thickness selected to provide the requisite anti-ballistic characteristic. The material described herein can be used to fabricate virtually any type of protective armor.

Cutting tools of virtually any geometry can be manufactured from the material described herein. Optimal geometries can be selected depending on the type of material being worked, and the conditions under which machining takes place, including the speeds and feed rates.

While advantageous embodiments have been chosen to illustrate the subject invention, it will be understood by those skilled in the art that various changes and modifications can be made therein without departing from the scope of the invention as defined by the appended claims.

What is claimed is:

1. A method of manufacturing a ceramic composite material comprising the steps of:

blending a plurality of constituent powders consisting essentially of, by mass ratio, 50–90% powdered boron carbide, 5–30% powdered silicon carbide, and 3–22% powdered titanium carbide, each powdered constituent having a particle size between 1 and 40 microns; and consolidating the blended constituent powders with the application of heat to form a ceramic composite body which includes 50–90% boron carbide, 5–30% silicon carbide, and 3–22% titanium carbide, and has fracture toughness of between 9–15 MPa×m$^{1/2}$.

2. A method according to claim 1, wherein the consolidation step comprises sintering the blended constituent powders to achieve a density of up to about 85% theoretical density, and a bending strength of $\geq 380$ MPa at 1,700° C.

3. A method according to claim 1, wherein the consolidation step comprises pressing in a hot press at a high working temperature and pressure for a time sufficient to substantially complete densification and achieve a stable temperature and pressure, and maintaining high heat and pressure in the press for a time sufficient to achieve a final, desired theoretical density and thereby stabilize the crystalline structure.

4. A method according to claim 3, wherein substantially complete densification occurs at about 94–95% theoretical density, and the final theoretical density is 97–98% theoretical density.

5. A method according to claim 4, wherein the heat and pressure are maintained for between 10 and 30 minutes after achieving substantially complete densification.

6. A method according to claim 3, wherein the working temperature of the press is in a range of 2,200° to 2,250° C. and the working pressure is in a range of 2.7 to 3.3 kg/mm$^2$.

7. A method according to claim 3, wherein the temperature and pressure within the press are maintained substantially constant during the consolidation step.

8. A method according to claim 1, wherein the blending step includes blending the constituent powders for a time sufficient to achieve a homogeneous mixture of the constituent powders and a uniform distribution of the particle sizes.

9. A method according to claim 1, wherein the powdered constituents have a particle size between 3 and 10 microns.

10. A method according to claim 1, wherein the constituent powders have a mass ratio of 70–80% boron carbide, 14–20% silicon carbide, and 5–11% titanium carbide, and the ceramic composite body includes 70–80% boron carbide, 14–20% silicon carbide, and 5–11% titanium carbide.

11. A method according to claim 1, wherein the constituent powders have a mass ratio of about 76.9% boron carbide, 15.4% silicon carbide, and 7.7% titanium carbide, and the ceramic composite body includes about 76.9% boron carbide, 15.4% silicon carbide, and 7.7% titanium carbide.

12. A method according to claim 1, wherein the consolidating step comprises placing the blended constituent powders in a graphite press-mold, placing the press-mold in a hot press, applying an initial pressure of about 0.2–0.5 kg/mm$^2$ while increasing a temperature of the press-mold up to the working temperature of between 2,200° and 2,250° C., increasing the mold pressure steadily up to the working pressure of about 2.7 kg/mm$^2$ to 3.3 kg/mm$^2$, maintaining the working temperature and pressure for a time sufficient to achieve densification of the constituent powders, maintaining the working temperature and pressure after desired densification for another 10 to 30 minutes, allowing the press-mold to cool to a temperature of between 500°–800° C. while continuing to maintain the working pressure, and releasing the working pressure while allowing the press-mold to cool to room temperature.

13. A method according to claim 1, further comprising varying granularity and quality of the constituent powders to tailor the properties of the ceramic composite material for different end uses.

14. A method according to claim 1, further comprising selecting a production method to tailor the properties of the ceramic composite material for different end uses.

15. A method according to claim 1, further comprising varying the mass ratios of the constituent powders to tailor the properties of the ceramic composite material for different end uses.

16. A method according to claim 1, further comprising adding minor additions of production facilitator constituents.

17. A method according to claim 1, further comprising varying the process parameters to tailor the properties of the ceramic composite material for different end uses.

18. A method according to claim 1, further comprising adding one of a fiber and whisker reinforcing material to the blended powder constituents.

* * * * *